United States Patent
Ossia (10) Patent No.: US 8,190,844 B2
(45) Date of Patent: May 29, 2012

(54) EFFICIENT ALERT MECHANISM FOR OVERUTILIZATION OF STORAGE RESOURCES

(75) Inventor: Yoav Ossia, Haifa (IL)

(73) Assignee: LSI Corporation, Milpitas, CA (US)

( * ) Notice: Subject to any disclaimer, the term of this patent is extended or adjusted under 35 U.S.C. 154(b) by 781 days.

(21) Appl. No.: 12/326,576

(22) Filed: Dec. 2, 2008

(65) Prior Publication Data

US 2010/0138627 A1 Jun. 3, 2010

(51) Int. Cl.
G06F 12/00 (2006.01)
G06F 13/00 (2006.01)
G06F 13/28 (2006.01)

(52) U.S. Cl. ........ 711/170; 711/114; 711/171; 711/172; 711/173

(58) Field of Classification Search .................. None
See application file for complete search history.

(56) References Cited

U.S. PATENT DOCUMENTS

| | | | | |
|---|---|---|---|---|
| 6,128,623 A * | 10/2000 | Mattis et al. | | 711/118 |
| 6,209,003 B1 * | 3/2001 | Mattis et al. | | 1/1 |
| 6,920,494 B2 * | 7/2005 | Heitman et al. | | 709/223 |
| 7,404,039 B2 * | 7/2008 | Smith | | 711/117 |
| 7,487,308 B1 * | 2/2009 | Dalal et al. | | 711/162 |
| 7,693,877 B1 * | 4/2010 | Zasman | | 707/707 |
| 2009/0276588 A1 * | 11/2009 | Murase | | 711/160 |

* cited by examiner

Primary Examiner — Sanjiv Shah
Assistant Examiner — Craig Goldschmidt
(74) Attorney, Agent, or Firm — William W. Cochran; Cochran Freund & Young LLC (57) ABSTRACT

Disclosed is a method of issuing volume level alerts to provide a warning that indicates overutilization of storage resources in a computer system. Volume level checking is performed without the necessity of checking all the volumes, but only upon the occurrence of certain changes so that the only the most problematic volumes are checked. Hence, only a small number of volumes must be checked and only in response to certain identified changes. The method is applicable to any criterion for overutilization of storage resources which satisfies basic persistency rules. The method is also applicable to assessing risk for the use of other resources, such as communication bandwidth, that are supplied by resource providers, or pools of providers, to users of bandwidth. The principles disclosed can be utilized to check resources on an asset by asset basis, using the free space ratio definition provided to assess risk of overutilization of resources.

4 Claims, 4 Drawing Sheets

400
Process for Creating Alerts When Volumes Are Assigned Space from Multiple Pools

EFFICIENT ALERT MECHANISM FOR OVERUTILIZATION OF STORAGE RESOURCES

BACKGROUND

Computer storage systems can use multiple disks for storing information. For example, on storage area networks (SANs) a computer on the network can access various storage disks on the network. Similarly, RAID systems can provide multiple disks that can be accessed by a computer system. Multiple disks can be grouped into storage pools. Logical volumes are created that can be allocated space on one or more storage disks in one or more storage pools. Storage volumes may be created, expanded, deleted by a computer system. These activities consume or release storage from the storage pools. Each storage pool may include a number of different disk drives having different sizes. Since logical volumes may be created or expanded during the operation of a computer system, it is necessary to ensure that sufficient storage space exists in the storage pools to prevent the overwriting and loss of data, or the inability to create of expand volumes.

SUMMARY OF THE INVENTION

An embodiment of the present invention may therefore comprise a method of issuing volume level alerts that provide a warning that indicates an overutilization of storage resources in a computer system comprising: providing a plurality of pools of storage disks; creating a plurality of logical volumes that are assigned storage space such that each volume of the plurality of volumes is assigned space in only one pool of the plurality of pools; determining a most problematic volume of the plurality of logical volumes for each pool of the plurality of pools by calculating a free space ratio for each volume that is assigned space in each pool, the free space ratio being substantially equal to the sum of all of the unallocated space in all of the pools from which each volume is assigned space divided by the size of each volume; recalculating the free space ratios of the volumes having space assigned to the predetermined pool if a volume in the predetermined pool is reduced in size, and the volume is the most problematic volume that was previously determined for the predetermined pool; comparing the free space ratios of the volumes having space assigned to the predetermined pool to identify the most problematic volume as a volume having the lowest free space ratio; calculating the free space ratio for a new volume if the new volume has space assigned to the predetermined pool; comparing the free space ratio of the new volume to the free space ratio of the most problematic volume to determine if the new volume is more problematic than the most problematic volume; making the new volume the most problematic volume if the new volume has a lower free space ratio than the most problematic volume; calculating the free space ratio of an existing volume that is expanded (expanded volume) if the expanded volume has space assigned to the predetermined pool; comparing the free space ratio of the expanded volume with the free space ratio of the most problematic volume to determine if the expanded volume is more problematic than the most problematic volume; making the expanded volume the most problematic volume if the expanded volume has a lower free space ratio than the most problematic volume; creating the alert whenever the most problematic volume for each pool has a free space ratio that is less than a predetermined amount.

An embodiment of the present invention may further comprise a method of issuing volume level alerts that provide a warning that indicates an overutilization of storage resources in a computer system comprising: providing a plurality of pools of storage disks; creating a plurality of logical volumes that are assigned storage space such that at least one volume in at least one pool of the plurality of volumes is assigned space in more than one pool of the plurality of pools; identifying a pool combination set which comprises a set of individual pools that are assigned space from at least one volume of the plurality of volumes and individual combinations of pools (combination pools) that are assigned space from at least one volume of the plurality of volumes; identifying a most problematic volume for each individual pool and combination pool that comprise the pool combination set by calculating the free space ratio for each volume of the plurality of volumes that is assigned space in each individual pool and combination pool that comprise the pool combination set, comparing the free space ratio for each volume of the plurality of volumes that is assigned space in each individual pool and combination pool that comprise the pool combination set, and selecting a volume of the plurality of volumes that is assigned space in each individual pool and combination pool that comprise the pool combination set having the lowest free space ratio as the most problematic volume for each individual pool and combination pool that comprise the pool combination set; recalculating the free space ratio of volumes that are assigned space in individual pools and combination pools in which a most problematic volume is assigned space if the most problematic volume is reduced in size; calculating a free space ratio for a new volume when a new volume is created; comparing the free space ratio for the new volume to the free space ratio of most problematic volumes that are assigned space in the individual pools and the combination pools in which the new volume is assigned space; making the new volume the most problematic volume for any of the individual pools and the combination pools in which the new volume has a lower free space ratio than the most problematic volumes that are assigned space in the individual pools and the combination pools in which the new volume is assigned space; calculating the free space ratio for an existing volume that is assigned space in individual pools and combination pools that comprise the pool combination set, if the existing volume is expanded (expanded volume); comparing the free space ratio of most problematic volumes that are assigned space in the individual pools and combination pools in which the expanded volume is assigned space; making the expanded volume the most problematic volume for any of the individual pools and combination pools in which the expanded volume has a lower free space ratio than the most problematic volumes that are assigned space in the individual pools and the combination pools in which the expanded volume is assigned space; creating an alert whenever a most problematic volume has a free space ratio that is less than a predetermined amount.

An embodiment of the present invention may further comprise a computer readable medium that stores a computer program for programming a computer system to perform a method of issuing volume level alerts that provide a warning that indicates an overutilization of storage resources in a computer system comprising: providing a plurality of pools of storage disks; creating a plurality of logical volumes that are assigned storage space such that each volume of the plurality of volumes is assigned space in only one pool of the plurality of pools; determining a most problematic volume of the plurality of logical volumes for each pool of the plurality of pools by calculating a free space ratio for each volume that is assigned space in each pool, the free space ratio being substantially equal to the sum of all of the unallocated space in all of the pools from which each volume is assigned space divided by the size of each volume; recalculating the free space ratios of the volumes having space assigned to the predetermined pool if a volume in the predetermined pool is reduced in size, and the volume is the most problematic volume that was previously determined for the predetermined pool; comparing the free space ratios of the volumes having space assigned to the predetermined pool to identify the most problematic volume as a volume having the lowest free space ratio; calculating the free space ratio for a new volume if the new volume has space assigned to the predetermined pool; comparing the free space ratio of the new volume to the free space ratio of the most problematic volume to determine if the new volume is more problematic than the most problematic volume; making the new volume the most problematic volume if the new volume has a lower free space ratio than the most problematic volume; calculating the free space ratio of an existing volume that is expanded (expanded volume) if the expanded volume has space assigned to the predetermined pool; comparing the free space ratio of the expanded volume with the free space ratio of the most problematic volume to determine if the expanded volume is more problematic than the most problematic volume; making the expanded volume the most problematic volume if the expanded volume has a lower free space ratio than the most problematic volume; creating the alert whenever the most problematic volume for each pool has a free space ratio that is less than a predetermined amount.

An embodiment of the present invention may further comprise a computer readable medium that stores a computer program for programming a computer system to perform a method of issuing volume level alerts that provide a warning that indicates an overutilization of storage resources in a computer system comprising: providing a plurality of pools of storage disks; creating a plurality of logical volumes that are assigned storage space such that at least one volume in at least one pool of the plurality of volumes is assigned space in more than one pool of the plurality of pools; identifying a pool combination set which comprises a set of individual pools that are assigned space from at least one volume of the plurality of volumes and individual combinations of pools (combination pools) that are assigned space from at least one volume of the plurality of volumes; identifying a most problematic volume for each individual pool and combination pool that comprise the pool combination set by calculating the free space ratio for each volume of the plurality of volumes that is assigned space in each individual pool and combination pool that comprise the pool combination set, comparing the free space ratio for each volume of the plurality of volumes that is assigned space in each individual pool and combination pool that comprise the pool combination set, and selecting a volume of the plurality of volumes that is assigned space in each individual pool and combination pool that comprise the pool combination set having the lowest free space ratio as the most problematic volume for each individual pool and combination pool that comprise the pool combination set; recalculating the free space ratio of volumes that are assigned space in individual pools and combination pools in which a most problematic volume is assigned space if the most problematic volume is reduced in size; calculating the free space ratio for a new volume when a new volume is created; comparing the free space ratio for the new volume to the free space ratio of most problematic volumes that are assigned space in the individual pools and the combination pools in which the new volume is assigned space; making the new volume the most problematic volume for any of the individual pools and the combination pools in which the new volume has a lower free space ratio than the most problematic volumes that are assigned space in the individual pools and the combination pools in which the new volume is assigned space; calculating the free space ratio for an existing volume that is assigned space in individual pools and combination pools that comprise the pool combination set, if the existing volume is expanded (expanded volume); comparing the free space ratio of most problematic volumes that are assigned space in the individual pools and combination pools in which the expanded volume is assigned space; making the expanded volume the most problematic volume for any of the individual pools and combination pools in which the expanded volume has a lower free space ratio than the most problematic volumes that are assigned space in the individual pools and the combination pools in which the expanded volume is assigned space; creating an alert whenever a most problematic volume has a free space ratio that is less than a predetermined amount.

An embodiment of the present invention may further comprise a computer system that is programmed to perform a method of issuing volume level alerts that provide a warning that indicates an overutilization of storage resources in a computer system comprising: providing a plurality of pools of storage disks; creating a plurality of logical volumes that are assigned storage space such that at least one volume in at least one pool of the plurality of volumes is assigned space in more than one pool of the plurality of pools; identifying a pool combination set which comprises a set of individual pools that are assigned space from at least one volume of the plurality of volumes and individual combinations of pools (combination pools) that are assigned space from at least one volume of the plurality of volumes; identifying a most problematic volume for each individual pool and combination pool that comprise the pool combination set by calculating the free space ratio for each volume of the plurality of volumes that is assigned space in each individual pool and combination pool that comprise the pool combination set, comparing the free space ratio for each volume of the plurality of volumes that is assigned space in each individual pool and combination pool that comprise the pool combination set, and selecting a volume of the plurality of volumes that is assigned space in each individual pool and combination pool that comprise the pool combination set having the lowest free space ratio as the most problematic volume for each individual pool and combination pool that comprise the pool combination set; recalculating the free space ratio of volumes that are assigned space in individual pools and combination pools in which a most problematic volume is assigned space if the most problematic volume is reduced in size; calculating the free space ratio for a new volume when a new volume is created; comparing the free space ratio for the new volume to the free space ratio of most problematic volumes that are assigned space in the individual pools and the combination pools in which the new volume is assigned space; making the new volume the most problematic volume for any of the individual pools and the combination pools in which the new volume has a lower free space ratio than the most problematic volumes that are assigned space in the individual pools and the combination pools in which the new volume is assigned space; calculating the free space ratio for an existing volume that is assigned space in individual pools and combination pools that comprise the pool combination set, if the existing volume is expanded (expanded volume); comparing the free space ratio of most problematic volumes that are assigned space in the individual pools and combination pools in which the expanded volume is assigned space; making the expanded volume the most problematic volume for any of the individual pools and combination pools in which the expanded volume has a lower free space ratio than the most problematic volumes that are assigned space in the individual pools and the combination pools in which the expanded volume is assigned space; creating an alert whenever a most problematic volume has a free space ratio that is less than a predetermined amount.

An embodiment of the present invention may further comprise an electrical signal that contains instructions for programming a computer to perform a method of issuing volume level alerts that provide a warning that indicates an overutilization of storage resources in a computer system comprising: providing a plurality of pools of storage disks; creating a plurality of logical volumes that are assigned storage space such that at least one volume in at least one pool of the plurality of volumes is assigned space in more than one pool of the plurality of pools; identifying a pool combination set which comprises a set of individual pools that are assigned space from at least one volume of the plurality of volumes and individual combinations of pools (combination pools) that are assigned space from at least one volume of the plurality of volumes; identifying a most problematic volume for each individual pool and combination pool that comprise the pool combination set by calculating the free space ratio for each volume of the plurality of volumes that is assigned space in each individual pool and combination pool that comprise the pool combination set, comparing the free space ratio for each volume of the plurality of volumes that is assigned space in each individual pool and combination pool that comprise the pool combination set, and selecting a volume of the plurality of volumes that is assigned space in each individual pool and combination pool that comprise the pool combination set having the lowest free space ratio as the most problematic volume for each individual pool and combination pool that comprise the pool combination set; recalculating the free space ratio of volumes that are assigned space in individual pools and combination pools in which a most problematic volume is assigned space if the most problematic volume is reduced in size; calculating the free space ratio for a new volume when a new volume is created; comparing the free space ratio for the new volume to the free space ratio of most problematic volumes that are assigned space in the individual pools and the combination pools in which the new volume is assigned space; making the new volume the most problematic volume for any of the individual pools and the combination pools in which the new volume has a lower free space ratio than the most problematic volumes that are assigned space in the individual pools and the combination pools in which the new volume is assigned space; calculating the free space ratio for an existing volume that is assigned space in individual pools and combination pools that comprise the pool combination set, if the existing volume is expanded (expanded volume); comparing the free space ratio of most problematic volumes that are assigned space in the individual pools and combination pools in which the expanded volume is assigned space; making the expanded volume the most problematic volume for any of the individual pools and combination pools in which the expanded volume has a lower free space ratio than the most problematic volumes that are assigned space in the individual pools and the combination pools in which the expanded volume is assigned space; creating an alert whenever a most problematic volume has a free space ratio that is less than a predetermined amount.

DETAILED DESCRIPTION OF THE EMBODIMENTS

Figure 1:
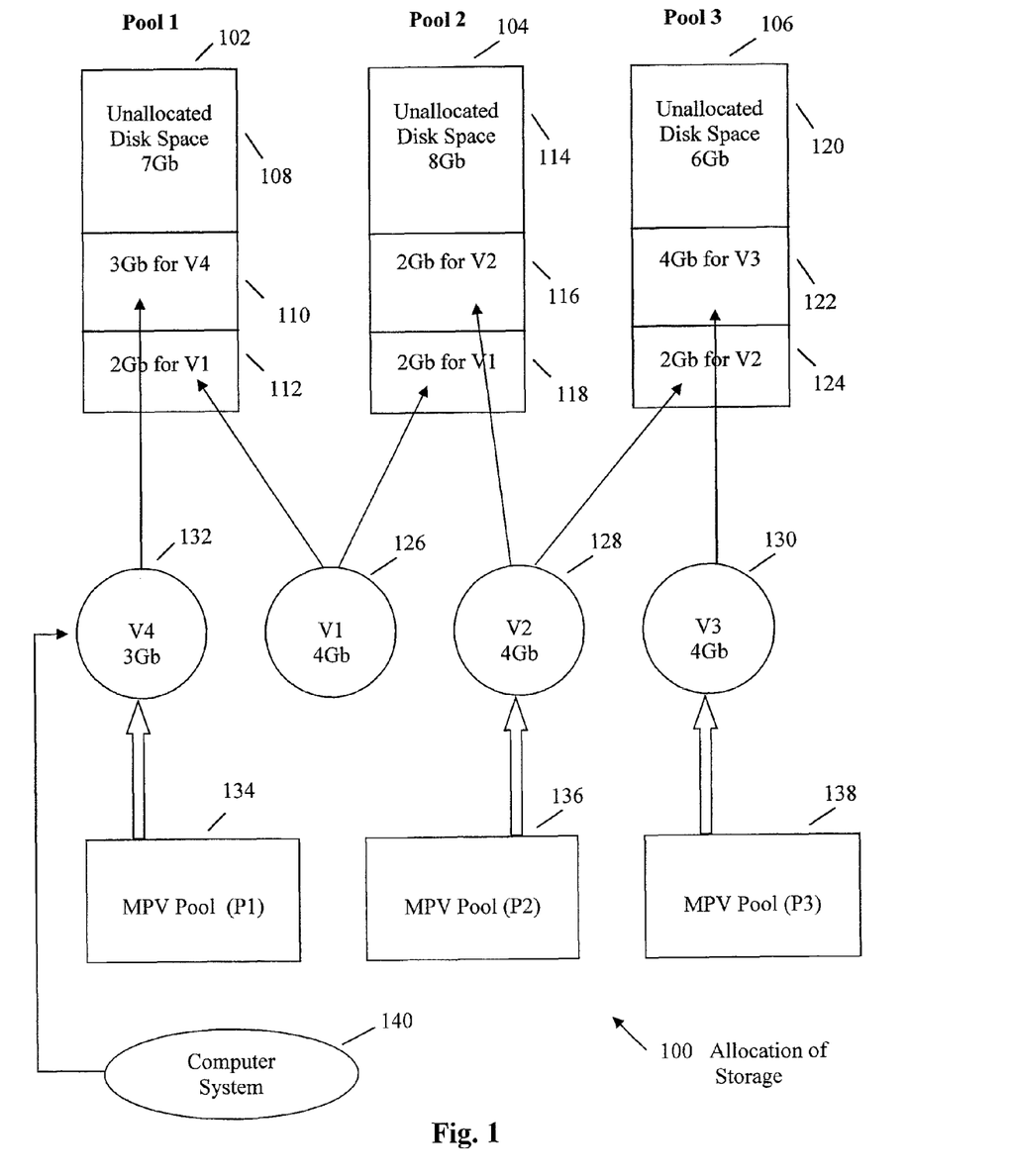
FIG. 1 is a schematic illustration of an example of the manner in which storage may be allocated on a storage system.

FIG. 1 is a schematic illustration of the manner in which logical volumes may be allocated storage in storage pools. FIG. 1 is a schematic illustration of storage 100. As shown in FIG. 1, a plurality of disks 102 may form pool one 102 that has a total storage space of 12 GB. Similarly, one or more disks may form pool two 104, which may also have a total storage area of 12 GB. Similarly, storage pool three 106 may be formed from one or more disks that also have a total storage area of 12 GB. Each of the pools may be formed from different size disks, the same size disks, or a single disk. In addition, each of the pools may have different sizes.

As illustrated in FIG. 1, the volumes 126, 128, 130, 132 are assigned space in each of the pools 102, 104, 106 by the computer system 140. For example, volume one 126 is assigned a total space of 4 GB from two different pools. Volume one 126 is assigned 2 GB 112 from pool one 102 and 2 GB 118 from pool two 104. Volume two has a total of 4 GB, with 2 GB 116 from pool two 104 and 2 GB 124 from pool three 106. Volume three has a total of 4 GB. Volume three has 4 GB 122 assigned from pool three 106. Volume four has a total of 3 GB. Volume three has 3 GB 110 assigned from pool one 102. Hence, volume one 126 has storage assigned from both pool one 102 and pool two 104. Volume two 128 has storage assigned from both pool two 104 and pool three 106. Volume three 130 only takes from pool three 106, while volume four 132 only takes from pool one 102.

FIG. 1 is simply an example of the manner in which volumes can be assigned space from different pools. Any particular volume can use many different pools, while each pool may provide storage to many different volumes. Further, the assignment of storage space is not static, but varies frequently. Additional volumes, expansion of volumes, the creation of temporary volumes, the elimination of volumes or the reduction in size of volumes occurs rapidly in storage systems. Further, a storage pool may be expanded or reduced in size by the addition or subtraction of disks that are not being used, as explained in more detail below.

As also illustrated in FIG. 1, a certain amount of unallocated disk space is provided in each of the pools, such as pools 102, 104, 106. For example, FIG. 1 illustrates that pool one 102 has unallocated disk space 108 which is 7 GB. Pool two 104 has unallocated disk space 114 of 8 GB. Pool three 106 has unallocated disk space 120 of 6 GB. The unallocated disk space is the reserve of storage space in each pool. A certain amount of reserve storage space must be maintained to ensure data integrity. If unallocated disk space falls below a certain level, urgent requests from users for additional space may not be serviced. In typical systems, if a new volume is created or a volume is expanded, a request will be made to allocate space in the pool for a new volume or an expanded volume. In many systems, a pool level alert will be generated if the unallocated disk space in the pool falls below a certain percentage of the total storage of the pool. For example, if the unallocated disk space in a pool falls to 20 percent or less of the total amount of storage in the pool, a pool level alert may be generated in many systems. The problem with this approach is that the overall space still available in any particular pool may be much larger since only a portion of each volume that has space allocated in any particular pool may actually be in use and storing data at that time. Hence, pool level alerts may not provide the precision necessary to accurately predict, to a desired level, the risk of future inability to service requests for the current amount of available storage space in a particular pool and, as such, may require excess storage space in many instances in order to avoid unnecessary alerts.

Hence, it is beneficial to obtain accurate proactive alerts with respect to overutilization of disk resources, so that the user may take actions for freeing resources before a critical situation occurs, in which a storage system is unable to meet the functional requirements of supplying, in real time, storage resources to existing volumes or new volumes.

A more precise way of determining the amount of storage space available is to check the actual amount of data space that is consumed in any particular volume and compare it to the excess storage space available in a pool. In other words, a more precise way of determining available storage space is to check each volume in a pool. Although pool level alerts are simpler to implement, since simple bookkeeping processes can be used to determine unallocated disk space in a pool, pool level alerts are less accurate and require wider safety margins in setting thresholds, as disclosed above. This results in overkill in large pools with many volumes, and may be insufficient in small pools with a few volumes. The use of volume specific thresholds is therefore a much more accurate way of issuing alerts.

Volume specific thresholds can be determined by determining the free space ratio in a volume, which is the unallocated disk space in each of the pools from which that volume obtains storage divided by the total space in a volume. For example, volume one 126 has been allocated 4 GB in pool one 102 and pool two 104. The total unallocated disk space in pool one 102 is 7 GB and in pool two 104 is 8 GB. Hence, the total unallocated disk space is 15 GB for pool one and pool two. The free space ratio of volume one is 15 GB/4 GB=3.75. Other ratios may also be used without deviating from the principles disclosed herein.

For each of the volumes illustrated in FIG. 1, the free space ratio can be easily determined. However, a computer system 140 may have many volumes. For example, a computer system may operate with 8,000 volumes or more. The run time overhead for executing volume level alerts, without employing the principles disclosed herein, is too big to be a practical way of generating alerts in most situations. For example, for changes in a pool, such as a change in the size of a pool, or a change in the size of any volume associated with a pool, all of the volumes associated with that pool must be checked in order to issue alerts if any of the volumes have reached an alert status as a result of a change. As indicated above, volumes are constantly being created and eliminated and changed in size. Further, pool sizes also frequently change. Hence, there is an enormous overhead associated with checking each volume to determine an alert status because of the frequent changes of volumes. Moreover, this overhead is imposed all of the time, even when there is normal or low resource utilization.

It would therefore be advantageous to be able to perform volume level checking without the necessity of checking all of the volumes, upon the occurrence of only those changes in the pool that require checking of the volumes. In that regard, it has been determined that only a single identified volume, or a small set of identified volumes, must be checked as a result of only certain changes in the pool size and volumes. In other words, rather than checking all of the volumes each time there is a change in the pool size, or the creation or expansion or elimination of a volume, only one or a small number of volumes must be checked, and only in response to certain identified changes.

In accordance with the various embodiments disclosed herein, a most problematic volume for each pool is identified and checked for certain changes in storage utilization. In accordance with the various embodiments disclosed herein, the free space ratio for each volume, which is defined above, is determined. For two volumes that share the same set of pools, if the free space ratio for a first volume is smaller than the free space ratio for a second volume, the free space ratio for those volumes will remain the same for any change in the free space or unallocated disk space in the pool, as long as these two volumes do not themselves change in size. In that case, the first volume is the most problematic volume for that particular pool, since it has a smaller free space ratio than the second volume. For example, considering FIG. 1, volume four 132 has a smaller free space ratio than volume one 126 in pool one 102. Volume four 132 is allocated 3 GB in pool one 102. The unallocated disk space 108 of pool one 102 is 7 GB. Hence, the free space ratio for volume four 132 is (7 GB)/(3 GB)=2.5. The free space ratio for volume one 126 is (7 GB)/(2 GB)=3.5. Since the free space ratio for volume four 132 is lower than the free space ratio for volume one 126, volume four is designated as the most problematic volume for pool one 102, as indicated by block 134. In a simple case, as set forth in FIG. 3, all of the volumes may use only one pool, and the most problematic volume in that pool is identified by determining the volume that has the highest free space ratio. When volumes are assigned space in more than one pool, as illustrated in FIG. 1, other more complex methods of determining the most problematic volume must be used, as explained in more detail below. Upon identification of the most problematic volumes, an alert is issued only when the most problematic volumes have a free space ratio that falls below a certain selected threshold. This greatly reduces the overhead in creating alerts. Further, a determination of the most problematic volumes as a result of a change requires a greatly reduced number of operational steps, as disclosed below, when compared to checking each of the volumes in any particular pool each time a change occurs. This further reduces the operational overhead of the system.

Figure 2:
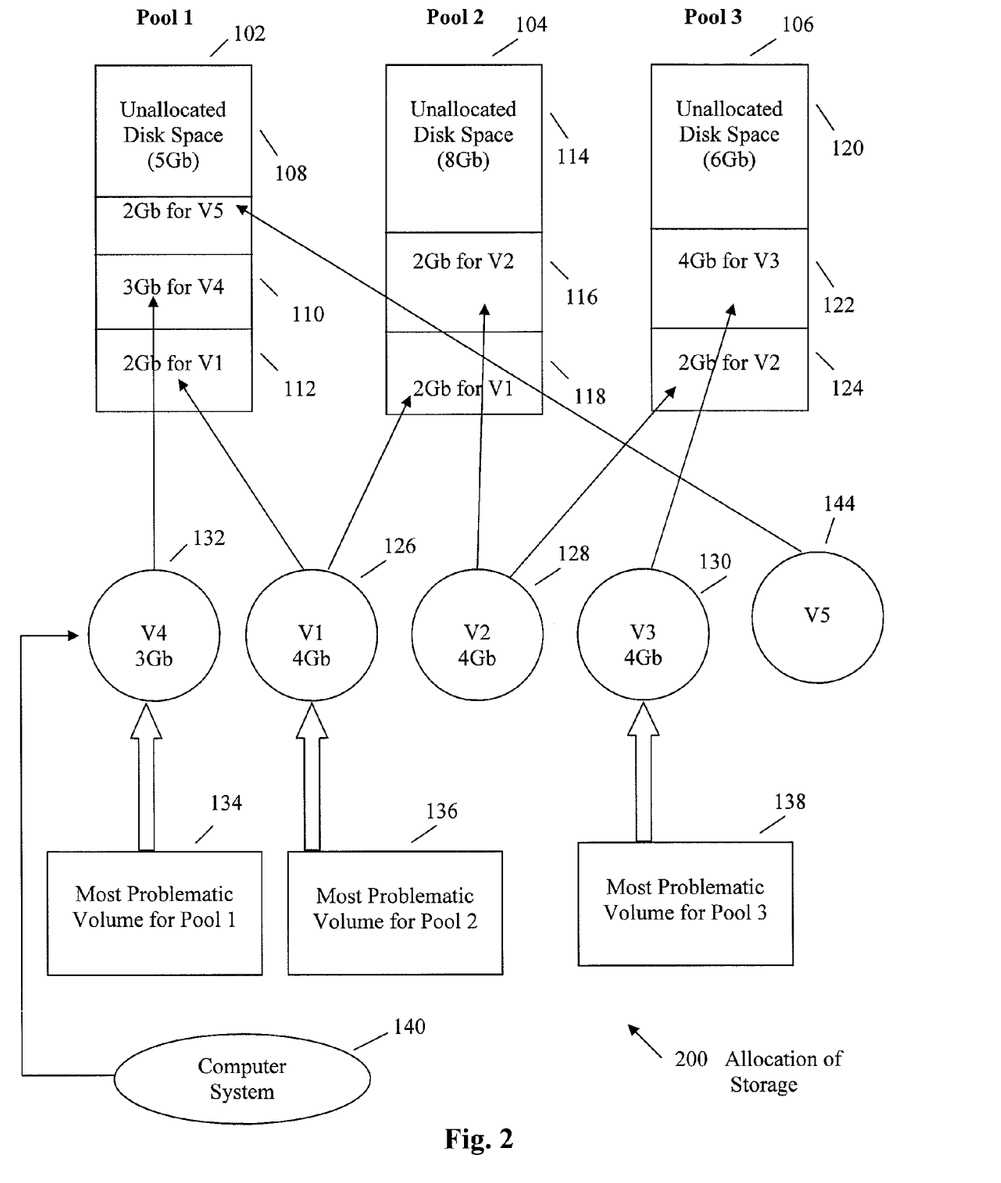
FIG. 2 is another example of the manner in which storage may be allocated on a storage system.

FIG. 2 is another schematic illustration of an allocation of storage 200 that is similar to FIG. 1. In FIG. 2, however, an additional volume, i.e., volume five 144, has been added to pool one 102. The addition of a volume that is assigned space in pool one 102 affects all of the volumes that are assigned space in pool one 102 and may affect which volume is the most problematic in other pools. For example, volume four 132 has a free space ratio of 5 GB/3 GB=1.66, while both volume one 126 and volume five 144 have a free space ratio of 5 GB/2 GB=2.33. Hence, volume four 132 has the lowest free space ratio and is identified as the most problematic volume for pool one 102, as indicated by block 134. The identification of volume four 132 as the most problematic volume in pool one 102 has not changed by the assignment of unallocated disk space of 2 GB in pool one 102 to volume five 144. However, volume two 128 in FIG. 1 was identified as the most problematic volume for pool two 104, as shown by block 136, because the free space ratio of volume two 128 was equal to (8 GB+6 GB)/4 GB=3.5, while the free space ratio of volume one 126 in FIG. 1 is (7 GB+8 GB)/4 GB=3.75. Referring again to FIG. 2, the free space ratio of volume two 128 is not changed by the changes to pool one 102, and is equal to 3.5, as indicated above. The free space ratio of volume one 126, however, has changed, since the unallocated disk space in pool one 102 has changed. As shown in FIG. 2, the free space ratio of volume one is (5 GB+8 GB)/4 GB=3.25, which is less than 3.5. Hence, volume one 126 becomes the most problematic volume in pool two 104, rather than volume two 128, because of the allocation of 2 GB in pool one 102 to volume five 144. Volume three 130 remains the most problematic volume for pool three 106, as indicated by block 138.

Hence, the allocation of space to a new volume, or the expansion of an existing volume in one pool, can cause another volume that is assigned space in that pool to become the most problematic volume in another pool, because the total amount of unallocated disk space is reduced for that volume. In this manner, the definition of the free space ratio allows for the identification of the most problematic volume for each pool in a plurality of pools in which volumes are assigned space, as schematically illustrated in the examples given in FIGS. 1 and 2.

Figure 3:
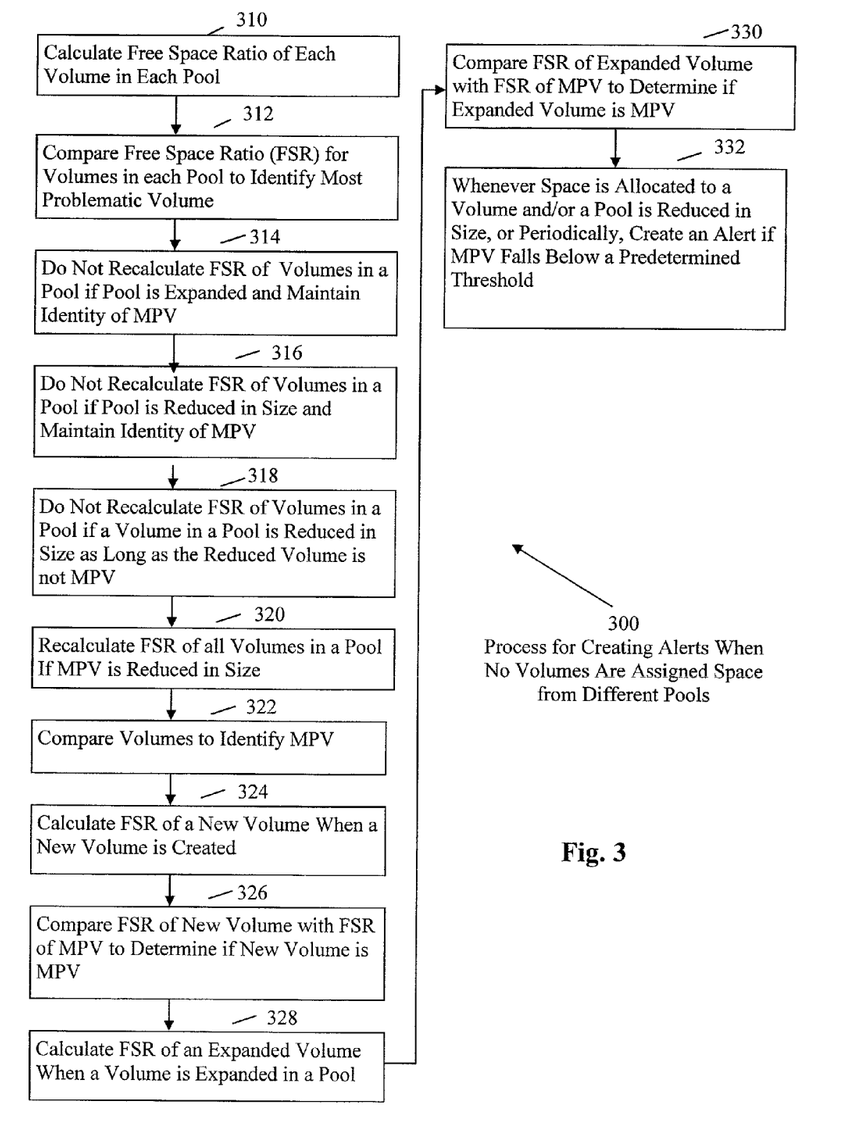
FIG. 3 is a flow diagram illustrating an embodiment of a process for creating alerts when no volumes are assigned space from more than one pool.

FIG. 3 illustrates the process 300 for creating alerts when no volumes are assigned space from different pools. Initially, the computer system 140 is connected to a plurality of pools. Each of the pools can contain one or more storage disks to create a storage pool. The storage pools 102, 104, 106 are schematically illustrated in FIGS. 1 and 2. Computer system 140 then creates a plurality of logical volumes 126-132 and 144 that access space in the pools 102-106. At step 310, the free space ratio is initially calculated for all of the volumes that are assigned space in each pool. Since each of the volumes is only assigned space in a single pool, the unallocated disk space from only one pool is used to calculate the free space ratio of each volume. This is a time-consuming process at first, but this process is only repeated under certain conditions, as explained in more detail below. At step 312, the free space ratio for each of the volumes in each pool is compared with the other volumes in the pool to identify the most problematic volume. Again, the free space ratio is substantially equal to the sum of all the unallocated space in all of the pools from which each volume is assigned space, divided by the size of each volume. At step 314, it is determined if one of the pools has expanded. If one of the pools has expanded, the free space ratio of the volumes having space assigned to that pool is not recalculated and the same most problematic volume that was previously identified is maintained as the most problematic volume. At steps 316, if a pool in the plurality of pools is reduced in size, it is not necessary to recalculate the free space ratio of all the volumes in that pool and the previously identified most problematic for that pool is maintained. At step 318, if a volume in a predetermined pool of the plurality of pools is reduced in size, it is not necessary to recalculate the free space ratio of the volumes having space assigned to that predetermined pool and the most problematic volume that was previously identified for that predetermined pool is maintained as the most problematic volume, as long as the volume that was reduced in size is not the most problematic volume. At step 320, if it is determined that the volume in the predetermined pool that is reduced in size is the most problematic volume that has been identified for that pool, then the free space ratios of all of the volumes having space assigned to that predetermined pool must be recalculated. After recalculation of the free space ratio of all of the volumes having space assigned to that predetermined pool are recalculated, the free space ratios of those volumes are compared to the identified most problematic volume in the pool, as indicated at step 322. The most problematic volume is then selected as the volume having the lowest free space ratio. At step 324, if a new volume is created that is assigned space to a predetermined pool, the free space ratio of the new volume is calculated. At step 326, the free space ratio of the new volume is compared with the free space ratio of the most problematic volume in that pool to determine if the new volume is more problematic than the most problematic volume. If the new volume has a lower free space ratio than the most problematic volume, the new volume is made the most problematic volume. At step 328, it is determined if an existing volume is expanded. The free space ratio of an expanded volume is then calculated. At step 330, the free space ratio of the expanded volume is compared to the free space ratio of the most problematic volume for that pool to determine if the expanded volume is more problematic than the most problematic volume. If the expanded volume is more problematic than the most problematic volume, the expanded volume is made the most problematic volume. At step 332, whenever space is allocated to volume and/or pool is reduced in size, or periodically, an alert is created if the most problematic volume for each pool falls below a predetermined threshold.

Figure 4:
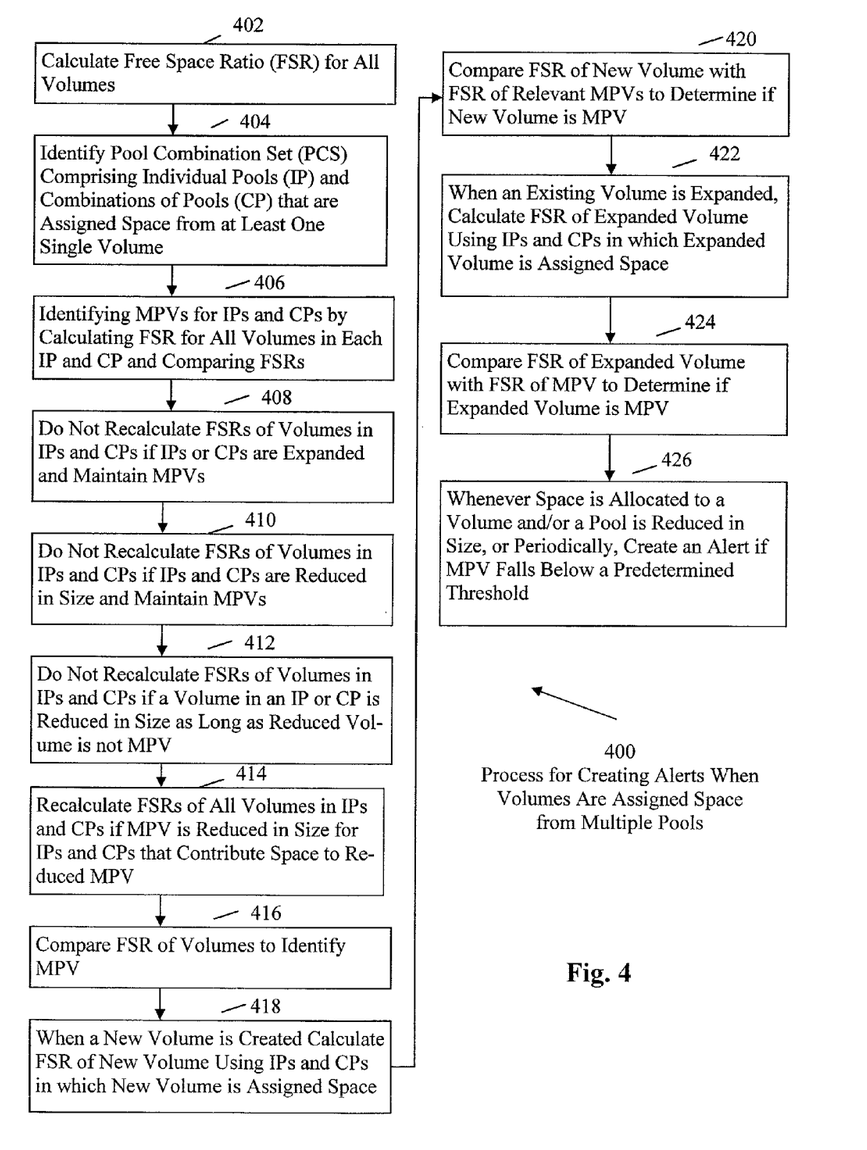
FIG. 4 is a flow diagram illustrating an embodiment of a process for creating alerts when volumes are assigned space from more than one pools.

FIG. 4 is a flow diagram illustrating an embodiment of a process for creating alerts when volumes are assigned from multiple pools. Hence, unlike the process 300 disclosed in FIG. 3, the process of FIG. 4 is a process for determining alerts when volumes, such as volume one 126 of FIG. 1 is assigned space in two different pools. At step 402, the free space ratio of all the volumes is initially calculated. At step 404, the pool combination sets are identified that comprise individual pools and combination pools that are assigned space from at least one single volume. For example, referring to FIG. 1, pool one 102 comprises an individual pool (IP) in the pool combination set. Likewise, pool two 104 and pool three 106 comprise individual pools (IPs) in the pool combination set. Since volume one 126 is assigned space in both pool one 102 and pool two 104, the combination pool (CP) consisting of pool one 102/pool two 104 is also included in the pool combination set. Similarly, volume two 128 is assigned space in pool two 104 and pool three 106. Hence, the combination pool consisting of pool two 104/pool three 106 is also included in the pool combination set. Another combination pool that could be included in the pool combination set for FIG. 1 could include the combination pool consisting of pool one 102/pool three 106. However, as shown in FIG. 1, there is no single volume that is assigned space in both pool one 102 and pool three 106. Therefore, the combination pool consisting of pool one 102/pool three 106 is not included in the pool combination set. The same is true for the combination pool consisting of pool one 102/pool two 104/pool three 106. There is no single volume that is assigned space in these three pools, so the combination pool of pool one 102/pool two 104/pool three 106 is not included in the pool combination set for FIG. 1. Hence, the pool combination set includes both individual pools and combinations pools.

As also shown in FIG. 4, at step 406, the most problematic volumes for each of the individual pools and combination pools is determined by calculating the free space ratio of all of the volumes in each of the individual pools and each of the combination pools that are included in the pool combination set. The free space ratios are then compared to determine the most problematic volumes in each individual pool and combination pool in the pool combination set. The volume having the lowest free space ratio for each individual pool and combination pool is set as the most problematic volume. At step 408, if any of the individual pools or combination pools that comprise a pool combination set are expanded, a free space ratio for the volumes having space assigned to such an expanded pool is not recalculated and the most problematic volume that was selected for the expanded pool is maintained. At step 410, if any of the individual pools or combination pools that comprise a pool combination set are reduced in size, the free space ratio of the volumes having space assigned to such a reduced pool are not recalculated and the most problematic volume that was selected for the reduced pool is maintained. In addition, the reduced pool is checked to ensure that an alert has not been issued. At step 412, if a volume that is assigned to any of the individual pools or combination pools that comprise the pool combination set are reduced in size, the free space ratio of the volumes having space assigned to the individual pools and combination pools in which the reduced volume is assigned space are not recalculated, unless the reduced volume is the most problematic volume. If the reduced volume is the most problematic volume, the free space ratios of all the volumes that are assigned space in each individual pool and combination pool in which the reduced most problematic volume is assigned space must be recalculated at step 414. At step 416, the free space ratio of the volumes are compared to identify the most problematic volume. At step 418, when a new volume is created and is assigned space in one or more individual pools or combination pools in the pool combination set, the free space ratio is calculated for the new volume using the unallocated disk space in the individual pools and combination pools in which the new volume is assigned space. At step 420, the free space ratio of the new volume is compared with the free space ratio of the most problematic volumes that are assigned space in the individual pools and combination pools in which the new volume is assigned space. The new volume is made the new most problematic volume for an individual pools and combination pools in which the new volume has a lower free space ratio than the most problematic volumes that are assigned space in the individual pools and combination pools. At step 422, when an existing volume is expanded, the free space ratio of the existing volume is calculated using the individual pools and combination pools in which the expanded volume is assigned space. At step 424, the free space ratio of the expanded volume is compared with the free space ratio of the most problematic volume. The expanded volume is then made the new most problematic volume for any individual pools and combination pools in which the expanded volume has a lower free space ratio than the most problematic volumes that are assigned space in the individual pools and combination pools in which the expanded volume is assigned space. At step 426, whenever space is allocated to volume and/or pool is reduced in size, or periodically, an alert is created whenever a most problematic volume falls below a predetermined threshold. In that fashion, a more precise way of determining overutilization of resources is provided using a process, such as process 400, to determine most problematic volumes.

The principles disclosed above can also be applied to other domains that do not relate to storage. For example, bandwidth allocation in networks is subject to the same type of overutilization. Bandwidth resources are typically managed in a fashion that allows for checking on a more refined basis in accordance with the principles disclosed above. In that regard, these principles can be used to assess risk regarding overutilization of bandwidth resources, or the risk of overutilization of any resource that utilizes individual assets that may share larger resource pools. In that regard, the definition of the free space ratio can be changed to be the unallocated resources in a pool from which an asset obtains those resources divided by the total amount of resource available for that asset. Using that generalized definition, other types of resources can be more easily managed, such as, but not limited to, network bandwidth resources.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of issuing volume level alerts that provide a warning that indicates an overutilization of storage resources in a computer system comprising:
    providing a plurality of pools, each of said pools comprising at least one storage disk;
    creating a plurality of logical volumes that are assigned storage space such that each volume of said plurality of volumes is assigned space in only one pool of said plurality of pools:
    calculating a free space ratio for each volume of said plurality of volumes, said free space ratio for each of said plurality of volumes being the sum of all of the unallocated space in the pool to which the volume is assigned divided by the size of the volume;
    identifying a most problematic volume, said most problematic volume being the volume having the lowest free space ratio;
    if the most problematic volume is reduced in size, recalculating the free space ratio of all of the volumes that are assigned to the same pool as the most problematic volume and re-identifying a most problematic volume, said most problematic volume being the volume having the lowest free space ratio;
    if a volume which is not the most problematic volume is expanded in size, recalculating the free space ratio of the volume that has expanded in size, comparing the recalculated free space ratio of the expanded volume with the most problematic volume to determine if the expanded volume is a new most problematic volume, and making the expanded volume the most problematic volume if the expanded volume has a lower free space ration than the most problematic volume;
    if a new volume is created, calculating the free space ratio for the new volume and comparing the calculated new volume free space ratio to the previous most problematic volume free space ratio to determine a new most problematic volume; and
    creating the alert whenever the most problematic volume for any of the plurality of pools has a free space ratio that is less than a predetermined level.

2. A method of issuing volume level alerts that provide a warning that indicates an overutilization of storage resources in a computer system comprising:
    providing a plurality of pools, each of said pools comprising at least one storage disk;
    creating a plurality of logical volumes that are assigned storage space in the plurality of pools, wherein at least one of said plurality of volumes is assigned space in more than one of the pools of said plurality of pools;
    for each of said plurality of volumes, identifying a pool combination set, wherein the pool combination set for each volume is the combination of all the pools that have assigned space to that volume;
    calculating a free space ratio for each volume of said plurality of volumes, said free space ratio being the total unused space in the pool combination set for each volume divided by the size of the volume;

comparing the free space ratios and identifying the volume with the lowest free space ratio as the most problematic volume;

if the most problematic volume is reduced in size, recalculating the free space ratio for each volume that is assigned space in any of the pools that are part of the combination pool set for the most problematic volume, and comparing the recalculated free space ratios to determine a new most problematic volume;

if a new volume is created, identifying the pool combination set for the new volume, calculating the free space ratio for the new volume, recalculating the free space ratio for each volume that is assigned space in any of the pools that are part of the combination pool set for the new volume, and comparing the calculated new volume free space ratio, the recalculated free space ratios and the previous most problematic volume free space ratio to determine a new most problematic volume;

if the size of a volume of the plurality of volumes is expanded, recalculating the free space ratio for each volume that is assigned space in any of the pools that are part of the combination pool set for the expanded volume, and comparing the recalculated free space ratios and most problematic volume free space ratio to determine a new most problematic volume;

creating the alert whenever the most problematic volume has a free space ratio that is less than a predetermined level.

3. A computer system that executes a program to issue volume level alerts that provide a warning that indicates an overutilization of storage resources in a computer system, comprising:

a plurality of pools, each of said pools comprising at least one storage disk and a plurality of logical volumes that are assigned storage space such that each volume of said plurality of volumes is assigned space in only one pool of said plurality of pools;

wherein the program calculates a free space ratio for each volume of said plurality of volumes, said free space ratio for each of said plurality of volumes being the sum of all of the unallocated space in the pool to which the volume is assigned divided by the size of the volume, and identifies the most problematic volume, said most problematic volume being the volume having the lowest free space ratio;

if the most problematic volume is reduced in size, the program recalculates the free space ratio of all of the volumes that are assigned to the same pool as the most problematic volume, and re-identifies the most problematic volume;

if a volume which is not the most problematic volume is expanded in size, the program recalculates the free space ratio of the volume that has expanded in size, compares the recalculated free space ration of the expanded volume with the most problematic volume to a new most problematic volume;

if a new volume is created, calculating the free space ratio for the new volume and comparing the calculated new volume free space ratio the previous most problematic volume free space ratio to determine a new most problematic volume; and wherein the program creates the alert whenever the most problematic volume has a free space ratio that is less than a predetermined level.

4. A computer system that executes; a program to issue volume level alerts that provide a warning that indicates an overutilization of storage resources in a computer system, comprising:

a plurality of pools, each of said pools comprising at least one storage disk; and a plurality of logical volumes that are assigned storage space in the plurality of pools and at least one of said plurality of volumes is assigned space in more than one of the pools of said plurality of pools;

wherein the program identifies a pool combination set for each of said plurality of volumes, the pool combination set for each volume being the combination of all the pools that have assigned space to that volume, calculates the free space ratio for each volume of said plurality of volumes, said free space ratio being the total unused space in the pool combination set for each volume divided by the size of the volume, compares the free space ratios and identifies the volume with the lowest free space ratio as the most problematic volume;

if the most problematic volume is reduced in size, the program recalculates the free space ratio for each volume that is assigned space in any of the pools that are part of the combination pool set for the most problematic volume, and compares the recalculated free space ratios to determine a new most problematic volume;

if a new volume is created, the program identifies the pool combination set for the new volume, calculates the free space ratio for the new volume, recalculates the free space ratio for each volume that is assigned space in any of the pools that are part of the combination pool set for the new volume, and compares the calculated new volume free space ratio, the recalculated free space ratios and the previous most problematic volume free space ratio to determine a new most problematic volume;

if the size of a volume of the plurality of volumes is expanded, the program recalculates the free space ratio for each volume that is assigned space in an of the pools that are part of the combination pool set for the expanded volume, and compares the recalculated free space ratios and most problematic volume free space ratio to determine a new most problematic volume; and wherein the program creates the alert whenever the most problematic volume has a free space ration that is less than a predetermined level.

* * * * *